United States Patent [19]

Narazaki et al.

[11] Patent Number: 5,400,120
[45] Date of Patent: Mar. 21, 1995

[54] ELECTROPHOTOGRAPHIC APPARATUS

[75] Inventors: Kazushige Narazaki, Katano; Yoshikazu Kawabe, Nagahama; Masafumi Yoshizawa; Osamu Ito, both of Kadoma, all of Japan

[73] Assignee: Matsushita Electric Industrial Co., Ltd., Kadoma City, Japan

[21] Appl. No.: 974,737

[22] Filed: Nov. 13, 1992

[30] Foreign Application Priority Data

Nov. 14, 1991 [JP] Japan .................................. 3-298725
Apr. 28, 1992 [JP] Japan .................................. 4-109669

[51] Int. Cl.⁶ ........................................... G03G 21/00
[52] U.S. Cl. .................................... 355/208; 355/246; 355/326 R; 358/504
[58] Field of Search .................... 358/80, 75, 504, 518; 355/208, 246, 326, 327, 326 R

[56] References Cited

U.S. PATENT DOCUMENTS

| | | | |
|---|---|---|---|
| 4,780,744 | 10/1988 | Porter et al. | 355/208 |
| 4,847,659 | 7/1989 | Resch, III | 355/346 |
| 4,894,685 | 1/1990 | Shoji | 355/246 |
| 4,974,024 | 11/1990 | Bares et al. | 355/208 |
| 5,148,289 | 9/1992 | Nishiyama et al. | 358/80 X |
| 5,206,686 | 4/1993 | Fukui et al. | 355/208 |

FOREIGN PATENT DOCUMENTS 49-36341 4/1974 Japan .
63-253383 10/1988 Japan .
4-85602 3/1992 Japan .

*Primary Examiner*—Benjamin R. Fuller
*Assistant Examiner*—John Barlow
*Attorney, Agent, or Firm*—Cushman, Darby & Cushman

[57] ABSTRACT

Qualitative relations between changes in a charge voltage, a developer bias voltage and an exposure light intensity control voltage and change in an image density are investigated in advance, and a density error is derived by a difference between the density of the image of a reference mark and a target density. Respective variations of the charge voltage, developer bias voltage and exposure light intensity control voltage are derived on the basis of the qualitative relations and the density error, and thereby the charge voltage, developer bias voltage and exposure light intensity voltage are changed so as to decrease the density error.

22 Claims, 15 Drawing Sheets

F I G. 10(a)
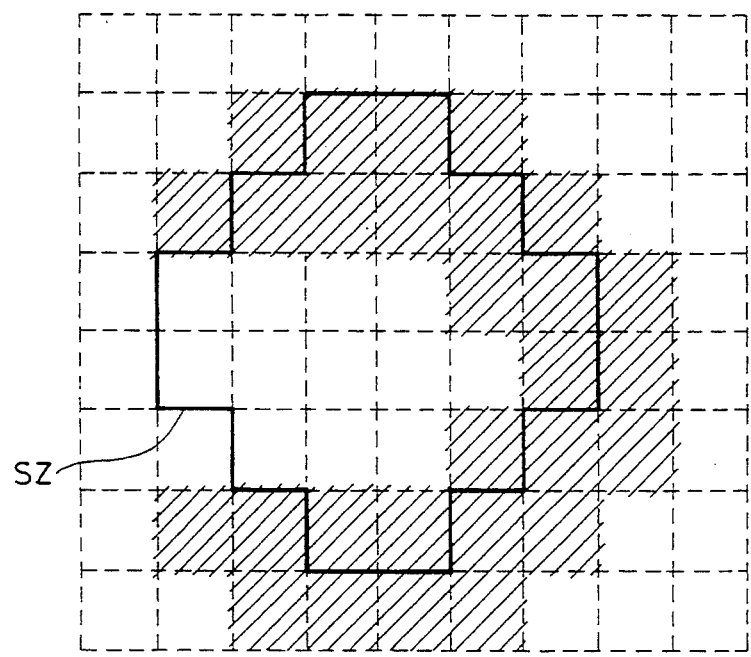

ELECTROPHOTOGRAPHIC APPARATUS

FIELD OF THE INVENTION AND RELATED ART STATEMENT

1. Field of the Invention

The present invention relates generally to an electrophotographic apparatus, and more particularly to a density control apparatus for controlling density of a reproduced image by a digital-exposure method in the electrophotographic apparatus.

2. Description of the Related Art

In the process of electrophotography, the density and/or the contrast of a reproduced image may be different from that of an original manuscript due to variation of circumferential conditions in use or deterioration of elements in the electrophotographic apparatus. The characteristic of an electrophotographic process is represented by "input voltages" such as a charge voltage of a photoconductive substance, a light intensity control voltage for controlling the amount of exposure light applied to the photoconductive substance and a bias voltage of toner and an "output density" representing a density of a reproduced image. Therefore, if the relationships between the input voltages and the output density can be derived quantitatively, the input voltages to realize a target density are obtainable. However, the sensitivity of the photoconductive substance varies because of deterioration thereof and changes of an exposure light intensity and light quality. Moreover in a developing process, the characteristics of the developer are influenced by various internal factors such as physical property of the toner or deterioration thereof, a thickness and a dielectric constant of the photoconductive substance, and further, by external factors such as variations in temperature and humidity. Therefore, it is very difficult to derive qualitatively these characteristics.

The prior art directed to control of the density of the reproduced image in the electrophotographic apparatus is in part shown by the Japanese published unexamined patents Sho 49-36341, Hei 4-85602 and Sho 63-253383, for example.

According to the Japanese published unexamined patent Sho 49-36341, a "toner density" representing the density of a toner image on the photoconductive substance is detected by a density sensor, and the maximum value of the toner density is compared with a predetermined reference density. An amount of toner supply to a developer unit is controlled so that the maximum value of the toner density is coincident with the reference density. Consequently, only the maximum density in the toner image is coincident with the reference density, but a middle density and a minimum density in the toner image are not always coincident with those of an original manuscript. Hence, this system will not be applicable to a color electrophotographic apparatus which requires correct reproduction in the middle density range.

According to another Japanese published a unexamined patent Hei 4-85602, an electrophotographic copier in an analog-exposure system (the analog-exposure system is defined by focusing an image of a manuscript on the photoconductive substance through an optical system) is controlled by using a "qualitative model" which is obtained by partially differentiating a relation representing the electrophotographic process. The qualitative model represents change of a sign of an output value with respect to a sign of an input by a "qualitative representation". In this density control system, a qualitative relation between a target value and a detected value is derived with respect to various changes of each parameters in the electrophotographic process, and the density of the image can be made to coincide with the target density by compensating the input value in compliance with the qualitative model. In this prior art system, a reference mark having a relatively higher density and another reference mark having a relatively lower density are used to detect the density in the toner image. The density of a reproduced image is coincident with the density of the manuscript by controlling the high density and the low density in the reproduced image on the basis of the target densities of the reference marks.

This prior art system is directed to the electrophotographic apparatus of the analog-exposure system as mentioned above. In contrast to the analog-exposure system, a digital exposure type electrophotographic apparatus forms an electrostatic latent image by scanning the photoconductive substance with a laser beam. Therefore, the above-mentioned qualitative model is not applicable to the digital-exposure type apparatus, because pixels of an image to be reproduced are produced by a laser beam whose intensity is modulated. Moreover, since the density of the reproduced image of such a digital type apparatus is detected by using two reference marks having a relatively higher density and a relatively lower density, accurate density reproduction is difficult in a middle density range.

According to another prior art Japanese published unexamined patent Sho 63-253383, the density in a color electrophotography apparatus adjusted by varying a developer bias voltage and the amount of toner which is supplied to a developer device. In the adjustment operation, the density of a toner image is detected, and the amount of toner and the bias voltage are adjusted so that the detected density is coincident with a reference density. The adjustment is made by using a predetermined table representing a relation between the developer bias voltage and an error of the detected value of the density with respect to the reference density. The density of the toner image is detected on the basis of detected values of a reference mark having a relatively higher density and a reference mark having a middle density. In the above-mentioned prior art, since the density of the toner image is adjusted by varying the amount of toner and the bias voltage, accurate control in density is not expected.

OBJECT AND SUMMARY OF THE INVENTION

An object of the present invention is to provide an electrophotographic apparatus of a digital-exposure system wherein the density of a reproduced image is controlled so as to coincide with a predetermined density distribution.

The electrophotographic apparatus in accordance with the present invention comprises:
- a member having photoconductive substance thereon,
- charge means for electrostatically charging said photoconductive substance,
- image signal generating means for outputting an image signal of an image to be reproduced on said photoconductive substance, reference mark signal generating means for outputting an image signal to be reproduced on said photoconductive substance of a reference mark of a high density, a reference mark of a low density, exposure means for producing an electrostatic latent image on said photoconductive substance by a light beam on the basis of the outputs of said image signal generating means and said reference mark signal generating means, target density setting means for setting a low target density and a high target density and outputting data of said target densities, developer means for developing said latent image by toner, density sensor means for detecting densities of the respective toner images of said reference marks, and outputting data of said densities of said reference marks, comparator means for comparing said data of the densities of said reference marks with said data of said target densities and outputting data of a low density error and a high density error, low density and middle density control means for calculating a variation of a charge voltage for said charge means, a variation of a developer bias voltage for biasing said developer means and a variation of a light intensity control voltage for controlling a light intensity of said exposure means on the basis of said low density error and constants predetermined on the basis of qualitative relations among the density of said reproduced image, said charge voltage, said developer bias voltage and said light intensity control voltage, and for outputting at least one of said variations, high density control means for calculating a variation of said charge voltage, a variation of said developer bias voltage and a variation of said light intensity control voltage on the basis of said high density error and constants predetermined on the basis of qualitative relations among the density of said reproduced image, said charge voltage, said developer bias voltage and said light intensity control voltage, and outputting at least one of said variations, input voltage generating means for generating said charge voltage, said developer bias voltage and said intensity control voltage, and input voltage operation means for changing said charge voltage, said developer bias voltage and said light intensity control voltage output by said input voltage generating means on the basis of at least one of variations output from said low density and middle density control means and said high density control means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
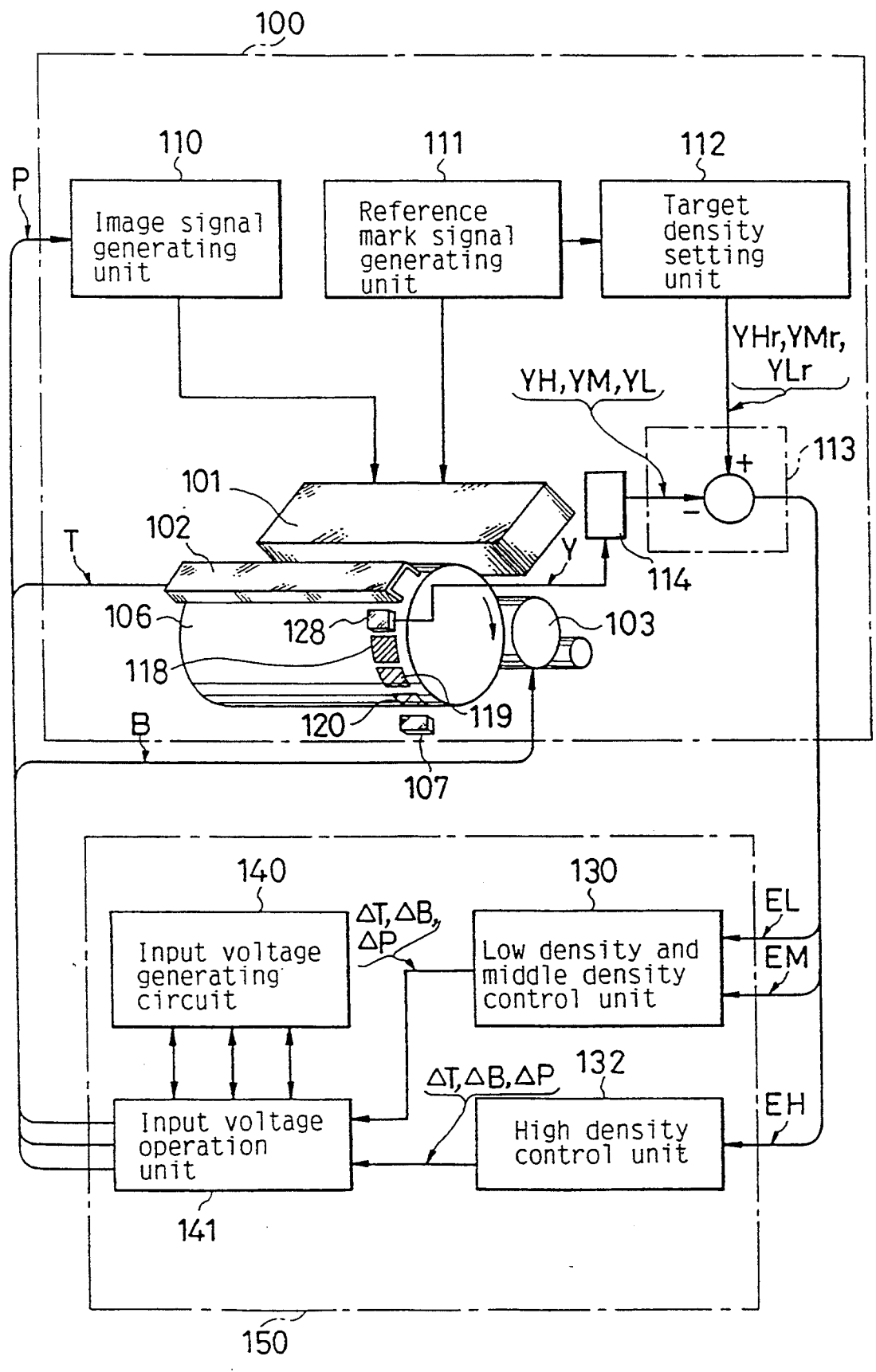
FIG. 1 is a block diagram of a first embodiment of an electrophotographic apparatus in accordance with the present invention.

FIG. 1 is a block diagram of a first embodiment of the electrophotographic apparatus in accordance with the present invention. The electrophotographic apparatus comprises en electrophotographic unit 100 which reproduces an electrophotographic image on the basis of input image data and an input voltage generating unit 150 for controlling the electrophotographic unit 100. The component units are explained hereafter unit by unit.

[Electrophotographic unit 100]

The electrophotographic unit 100 comprises a rotating drum 106, a charge unit 102, an exposure unit 101, a developer unit 103, an image signal generating unit 110, a reference mark signal generating unit 111, a density sensor 128, an A/D converter 114, a target density setting unit 112 and a comparator 113.

The rotating drum 106 has a known photoconductive substance on the surface thereof.

The charge unit 102 is for electrostatically charging the photoconductive substance preliminarily to an optical exposure by a laser beam.

Figure 2:
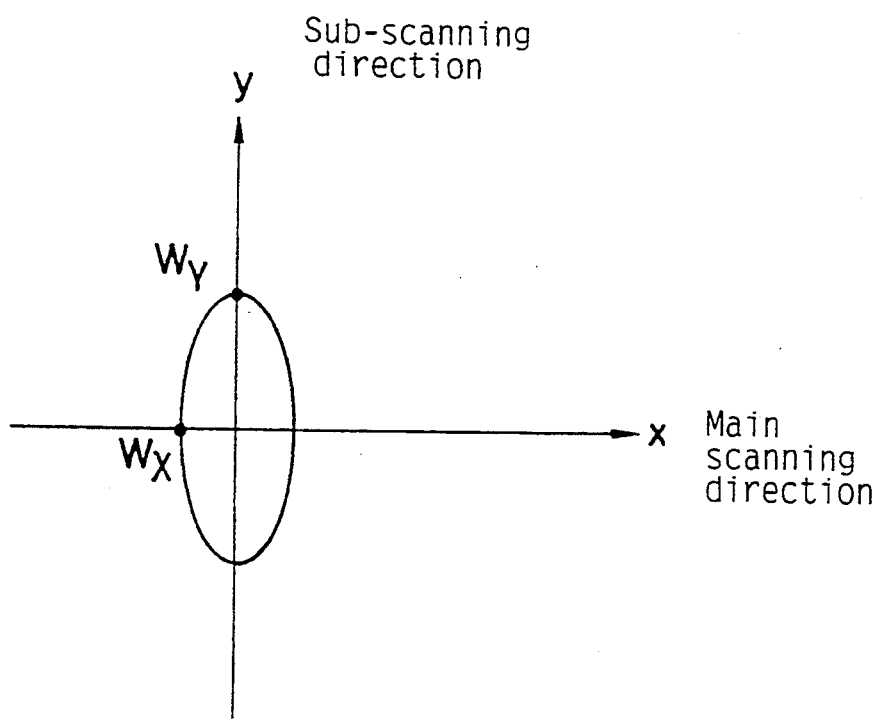
FIG. 2 is a cross-section of a laser beam.

The exposure unit 101 is for producing an electrostatic latent image on the photoconductive substance which has been charged by an optical exposure by mean of a laser beam. The exposure unit 101 further comprises a semiconductor device for emitting laser light and an optical system such as a polygonal mirror for scanning the laser beam on the drum 106. The cross-section of the laser beam is oval as shown in FIG.2, with its minor axis (x) parallel to the rotational axis of the drum 106 shown by the abscissa (main scanning direction), and with its major axis (y) parallel to a tangential to the drum 106 as shown by the ordinate axis (sub-scanning direction).

The developer unit 108 is for developing the latent image by toner.

Image data or character code data is applied to the image signal generating unit 110, and a signal of an image to be reproduced is output to the exposure unit 101.

The reference mark signal generating unit 111 is for producing signals for making toner images of a reference mark 118 of a high density, a reference mark 120 of a low density and a reference mark 119 of a middle density between the reference marks 118 and 120 on the drum 106 by the exposure unit 101.

The density sensor 128 is for detecting densities of the reference marks 118, 119 and 120 which are reproduced on the drum 106 on the basis of the output of the reference mark generating unit 111. The density sensor 128 comprises a known light source (not shown) and an optical sensor element (not shown). Reflected light from the toner image of the reference mark 118, 119 or 120 caused by illumination by the light source is detected by the optical sensor element, and respective densities are detected by the density sensor 128.

The A/D converter 114 is for converting the output of the density sensor 128 to digital output data.

The target density setting unit 112 is for setting predetermined target densities. The low target density YLr, a middle target density YMr and a high target density YHr are individually set for the target densities, and the data of these target densities are applied to the comparator 113 in synchronism with the reference mark signal generating unit 111.

In the comparator 113, the output data of the detected density of the A/D converter 114 is compared with the data of the target density which is applied from the target density setting unit 112, and a low density error signal EL, a middle density error signal EM and a high density error signal EH are output therefrom. These error signals each represent an error value between the detected density and the target density. In the comparison operation, the output density is subtracted from the target density, and when the output density is lower than the target density, the error value is a positive value, and the sign of the error is "+". On the other hand, when the output density is larger than the target density, the error value is a negative value, and the sign of the error is "−".

[Input voltage generating unit 150]

The input voltage generating unit 150 comprises an input voltage generating circuit 140, a low density and middle density control unit 130, a high density control unit 132, and an input voltage operation unit 141.

The input voltage generating circuit 140 comprises a circuit for generating a charge voltage T which is applied to the charge unit 102, a developer bias voltage B which is applied to the developer unit 103 and a light intensity control voltage P for controlling the intensity of the laser beam of the exposure unit 101. The input voltage generating circuit 140 further comprises a memory, which stores the charge voltage T, the developer bias voltage B and the light intensity control voltage P which have been output in the previous control operation. The stored voltages are applied to an input voltage operation unit 141 in the subsequent control operation.

The low density and middle density control unit 130 performs a predetermined calculation on the basis of the low density error signal EL and the middle density error signal EM both inputted from the comparator 113. Thereby a variation $\Delta T$ of the charge voltage T, a variation $\Delta B$ of the developer bias voltage B and a variation $\Delta P$ of the light intensity control voltage P are output to change the charge voltage T, the bias voltage B and the light intensity control voltage P in the subsequent control operation.

The high density control unit 132 performs a predetermined calculation on the basis of the high density error signal EH inputted from the comparator 113. Thereby a variation $\Delta T$ of the charge voltage T, a variation $\Delta B$ of the developer bias voltage B and a variation $\Delta B$ of the light intensity control voltage P are output to change the charge voltage T, the developer bias voltage B and the light intensity control voltage P in the subsequent control operation.

In the input voltage operation unit 141, the variations output from the low density control unit 130 and the high density control unit 182 are added to the respective charge voltage T, the developer bias voltage B and the light intensity Control voltage P which have been output in the previous control operation and are stored in the memory of the input voltage generating circuit 140. Thereby a new charge voltage T, a new bias voltage B and a new light intensity control voltage P are generated. These voltages are applied to the respective units in the electrophotographic unit 100.

In the electrophotographic apparatus configured as mentioned above, a total exposure light energy $E_{IM}$ per one pixel which is produced by the laser beam is represented by equation (1), $$E_{LM} = \frac{2P}{\pi \cdot W_X \cdot W_Y} \exp\left(-\frac{2y^2}{W_{Y2}}\right) \int_0^{\Delta t} \exp\left(-\frac{2(x-vt)^2}{W_{X2}}\right) dt, \tag{1}$$

where,
P = intensity of laser light,
x = position in main scanning direction,
y = position in sub-scanning direction,
$W_X$ = a radius of the section of the laser beam in the main scanning direction on the photoconductive substance,
$W_Y$ = a radius of the section of the laser beam in the sub-scanning direction on the photoconductive substance, the major and minor radii $W_X$, $W_Y$ are being measured at positions at which the intensity of the laser beam is $1/e^2$ (e = 2,718 ...) when the intensity at the center of the laser beam is "1",
$\Delta t$ = a time duration of the laser beam pulse and,
v = scanning speed of the laser beam.

The surface potential $V_{IM}$ of the electrostatic latent image on the photoconductive substance is given by equation (2):

$$V_{IM} = (\sqrt{VT} - S \cdot E_M)^2, \tag{2}$$

where
VT = a surface potential of the photoconductive substance which is charged by the charge voltage T of the charge unit 102,
S = sensitivity of the photoconductive substance.

An output image density DS defined by the density of a visible toner image, which is generated by developing the electrostatic latent image with toner, is given by equation (3):

$$DS = \gamma S \cdot (VB - V_{IM}) \qquad (3),$$

where
- $\gamma S$ = a development constant which is determined by the developer unit 103 and the characteristic of toner, and
- VB = a bias potential of toner which is given by the developer bias voltage B.

The process of the electrophotographic apparatus is represented by the above-mentioned equations (1), (2) and (3). The sensitivity S and the development constant $\gamma S$ in the equations are varied by a temperature and a humidity change or a change with the passage of time. Therefore, these values can not be accurately measured, and thus fixed solutions of the three equations (1), (2) and (3) are not obtainable. Therefore, in place of mathematically obtaining the solutions of the equations (1), (2) and (3), the present invention utilizes a qualitative model which is elucidated below.

[Qualitative model]

A "qualitative model" is derived on the basis of qualitative relations among the charge voltage T, the developer bias voltage B and the light intensity control voltage P and the output image density DS which are elements in the three equations (1), (2) and (3). In the qualitative relations, according to the equation (2) for example, when the total exposure light energy $E_{IM}$ increases, the surface potential $V_{IM}$ of the photoconductive substance decreases. Moreover, according to the equation (3), for example, when the surface potential $V_{IM}$ decreases, the output image density DS increases. On the basis of the qualitative relations as mentioned above, increase or decrease of the output image density DS which is caused by increase or decrease of the input voltages is represented by a qualitative representation. The qualitative model is formed by the qualitative representations. In the qualitative representation, an increase of an input voltage is represented by the sign "+" and a decrease of a input voltage is represented by the sign "−".

Several qualitative relations are obtained in connection with the low and middle density parts of toner image from the equations (1), (2) and (3). These qualitative relations are elucidated with reference to FIGS. 3(a), (b) and (c).

Figure 3A:
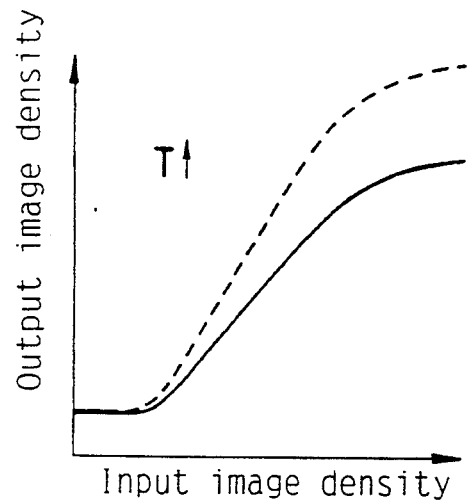
FIGS. 3(a), 3(b) and 3(c) are diagrams of relations between an input image density and an output image density With respect to, changes of input voltages of a charge voltage T, a developer bias voltage B and a light intensity control voltage P of the laser beam.
Figure 3B:
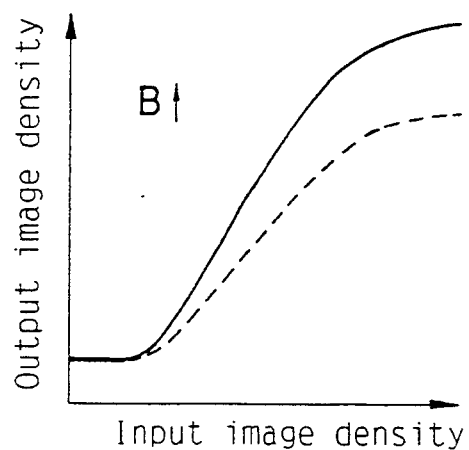
Figure 3C:
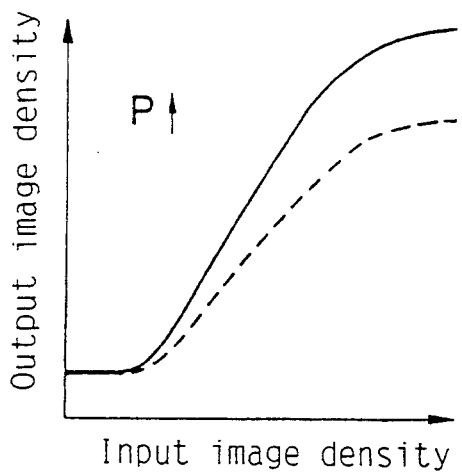

FIGS. 3(a), 3(b) and 3(c) are diagrams representing relationships between an "input image density" and the output image density. The input image density is defined by the density of a toner image to be reproduced on the photoconductive substance, and is substantially the density of a manuscript to be reproduced. The input image density corresponds to an exposure (exposure light energy), and the exposure is controlled by changing a time duration of the radiation of the laser beam. Curves illustrated with dotted lines in each diagram represent relations between the input image density and output image density before a change of the input voltages. An upward-directing arrow or a downward-directing arrow placed adjacent to a reference character represents an increase or a decrease of the input voltage shown by the reference character, respectively.

(1) In FIG. 3(a), when only the charge voltage T is increased, the output image density with respect to the input image density is decreased.

(2) In FIG. 3(b), when only the bias voltage B is increased, the output image density with respect to the input image density is increased.

(3) In FIG. 3(c), when only the light intensity control voltage P is increased, the output image density with respect to the input image density is increased.

(4) The variation trend of the output image density caused by a change of the charge voltage T is opposite to the variation trend of the output image density caused by a change of the bias voltage B, and both the variations are nearly equal in the low and middle density parts of the input image density.

Figure 4:
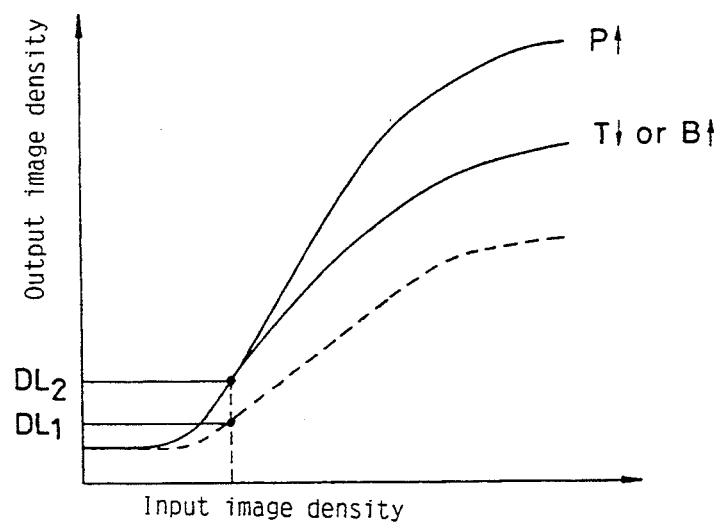
FIG. 4 is a diagram representing variations of the output image density in a middle density part and a high density part of the input image density with respect to variations of the input voltages under the same variation of the output image density in a low density part.

FIG. 4 is a diagram representing variations in the middle and high density parts in the case that the variation in the low density part is a constant. Referring to FIG. 4, in an unsaturated state in the potential of the photoconductive substance, when the output image density is varied from an output image density $DL_1$ to an output image density $DL_2$ by changing one of the charge voltage T, bias voltage B and light intensity control voltage P, the curve moves upward by the same distance owing to a decrease of the charge voltage T or to an increase of the bias voltage B. On the other hand, when the light intensity control voltage P is increased, the curve is significantly moved upward. Namely, the density variations in the range of middle and high density parts with respect to the same density variation in the low density part mostly changes the light intensity control voltage P.

Incidentally, in the output image density, an area ratio of toner (a ratio of an area of toner to a unit area of the photoconductive substance surface) is 0–35% in the "low density part", 35–70% in the "middle density part" and 71–100% in the "high density part".

The qualitative model based on the above-mentioned qualitative relations is shown in Table 1 with respect to the low and middle density parts.

TABLE 1

| | Low density error (EL) | | Middle density error (EM) | |
|---|---|---|---|---|
| Sign of error | − | + | − | + |
| Variation | $+\Delta T$ or $-\Delta B$ | $-\Delta T$ or $+\Delta B$ | $-\Delta P$ | $+\Delta P$ |
| Change of input | T ↑ or B ↓ | T ↓ or B ↑ | P ↓ | P ↑ |

Referring to Table 1, a low density error EL, a middle density error EM and a high density error EH (not shown in Table 1) are defined by a difference between the low target density YLr and a detected low density YL, a difference between the middle target density YMr and a detected middle density YM and a difference between the high target density YHr and a detected high density YH, respectively, and are given by equations (4), $$\left. \begin{array}{l} EL = TLr - YL \\ EM = YMr - YM \\ EH = YHr - YH \end{array} \right\} \qquad (4)$$

The low density error EL, middle density error EM and high density error EH are data representing the respective error values, and have a positive sign or a negative sign.

In the electrophotographic apparatus shown in FIG. 1, these density errors are detected in the order of the high density error EH, the middle density error EM and the low density error EL on the basis of the high density reference mark 118, the middle density reference mark 119 and the low density reference mark 120, respectively.

According to the Table 1, the variation ΔT of the charge voltage T has an opposite sign with respect to the sign of the low density error EL, and the variation ΔB of the bias voltage B has the same sign with respect to the low density error EL. Moreover, the variation ΔP of the light intensity control voltage P has the same sign with respect to the sign of the middle density error EM.

Figure 5A:
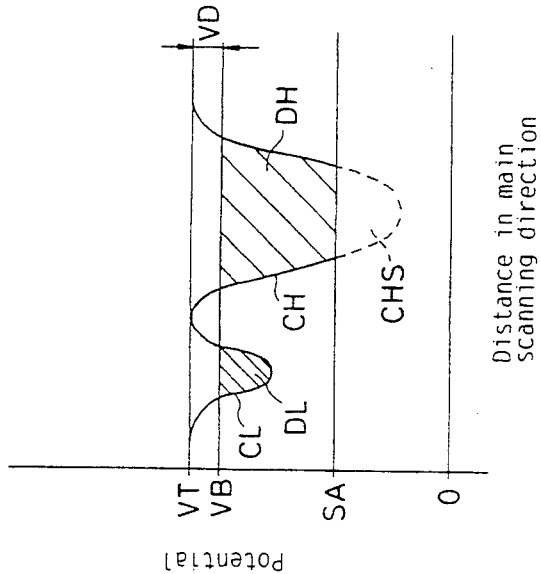
FIGS. 5(a) and 5(b) are diagrams representing variation of the potential of a latent image in the case that a charge potential VT and a bias potential VB are changed with a predetermined difference therebetween.

On the other hand in the high density part, the saturation of the potential of the photoconductive substance must be considered. FIG. 5(a) is a diagram representing a potential of the electrostatic latent image in an unsaturated state of the potential of the photoconductive substance. Referring to FIG. 5(a) the, ordinate designates potential and the abscissa designates distance in the main scanning direction. The polarity of potential of the photoconductive substance is negative for most in actual electrophotographic apparatus. In order to make understanding the embodiment of the present invention easy, it is provided that the photoconductive substance is charged with a positive potential; however, this embodiment also is applicable to the case where the photoconductive substance is charged with a negative potential.

A potential VT is the potential of the photoconductive substance charged by the charge unit 102, and a potential VB is a bias potential of toner which is biased by the bias voltage B. A potential SA is a saturation potential of the photoconductive substance, and the potential of the electrostatic latent image does not decrease below the potential SA. A curve CL illustrates a potential distribution of the electrostatic latent image for producing a low density toner image. When the low density toner image is produced, the time duration of the laser light emission is shortened, and the life length L1 of the latent image is relatively short. Since this light energy is relatively low, the potential fall of the latent image is small. When the latent image is developed, the amount of toner which is proportional to the area of a hatched part adheres on the photoconductive substance.

On the other hand, a curve CH illustrates potential distribution of a latent image producing a high density toner image. Since the time duration of the laser light emission is prolonged in order to produce the high density toner image, the length L2 of the latent image is longer than the length L1. Therefore, a large amount of light energy is applied and the potential of the latent image is significantly lowered. In FIG. 5(a), the lowest potential N1 of the latent image is in the neighborhood of the saturation potential SA. When such the latent image is developed, the amount of toner which is proportional to the area of a hatched part adheres on the photoconductive substance.

In the case of an unsaturated state of the potential of the photoconductive substance shown in FIG. 5(a), when the potential VB is increased to increase the density of the high density part DH in the latent image, the density of the low density part DL is also increased. Moreover, in order to increase the density of the high density part DH without further increase of the density of the low density part DL for example, the difference between the potentials VT and VB is maintained at a constant value and the light intensity control voltage P is increased. This operation utilizes the relations shown in FIG. 4.

Figure 5B:
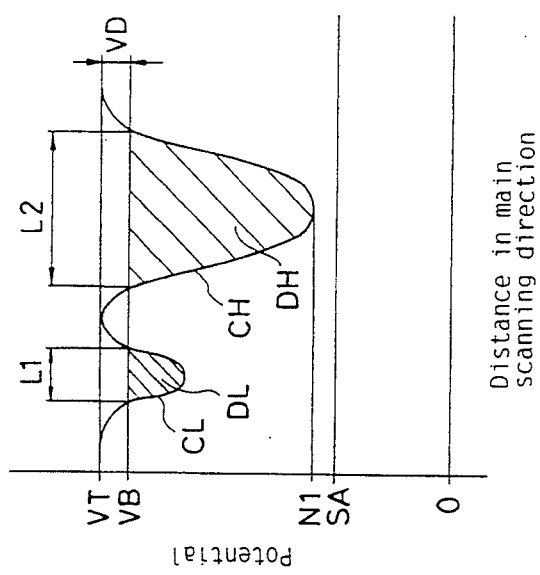

On the other hand, the density in the high density part DH can be decreased by utilizing saturation of the potential of the photoconductive substance without variation of density in the low density part as shown in FIG. 5(b). Referring to FIG. 5(b), both the potentials VT and VB are decreased to retain a constant difference therebetween, and hence both the potentials of the latent images of the low density part CL and the high density part CH decrease. However, a low potential part CHS of the high density part DH is not lowered below the saturation potential SA. Consequently, a difference in potential of the latent image of the high density part DH is equal to the difference (VB−SA) between the potential VB and the potential SA, and is lower than the difference (VB−N1) of the potential in the high density part DH shown in FIG. 5(a). Consequently, the area of a hatched part is decreased, and the toner image density is also decreased. In the above-mentioned case, the variation of the area of the hatched part in the low density part DL is negligibly small, and thus the variation in its density is also negligible.

Figure 6A:
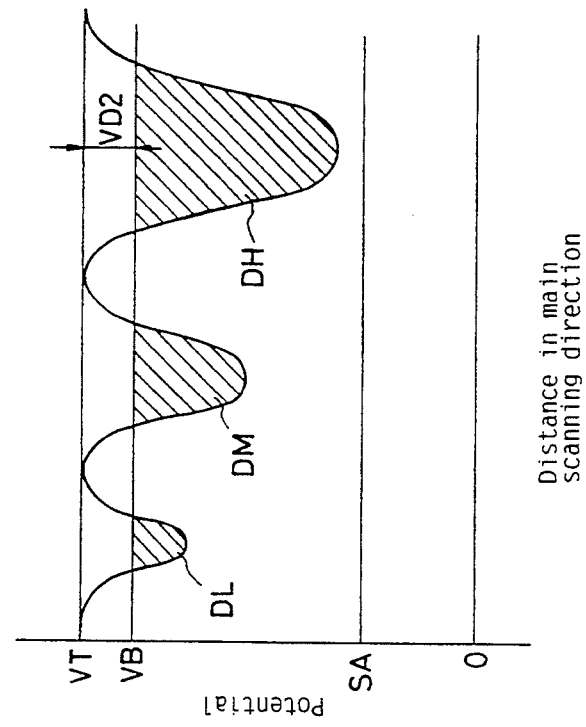
FIGS. 6(a) and 6(b) are diagrams representing variations of the potential of the latent image in the case that the charge potential VT, developer bias potential VB and an exposure are increased.

In the above-mentioned density control in the high density part DH, the saturation in the potential of the photoconductive substance is utilized. A method for controlling the density within the unsaturation potential range is elucidated with reference to FIGS. 6(a) and 6(b).

Figure 6B:
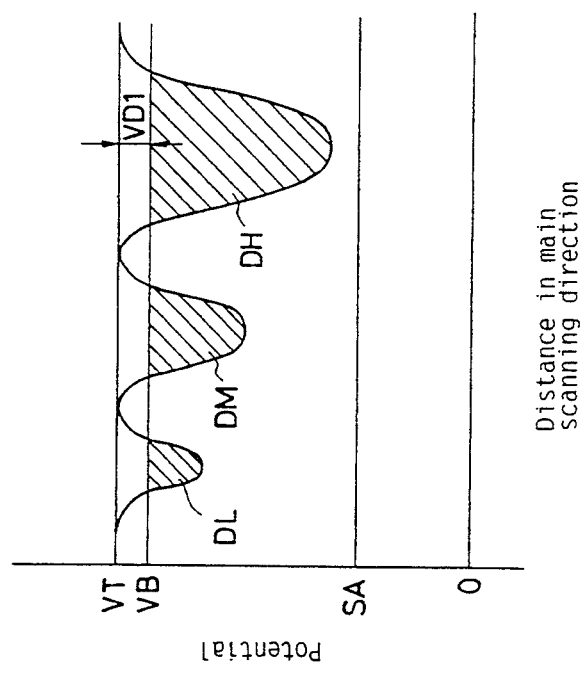

FIG. 6 is a diagram illustrating potential distribution of the low, middle and high density parts in the case of a difference VD1 between the potentials VT and VB. FIG. 6(b) is a diagram illustrating the potential distribution in the case that the light intensity control voltage P, the potential VT and the potential VB are increased. Additionally, a difference VD2 between the potentials VT and VB is increased. As shown by FIG. 6(b), the area of the low density part DL is not so increased, but the areas of the middle density part DM and the high density part DH are increased. Consequently, the densities in the middle and high density parts DM and DH are increased in comparison with the low density part DL. The above-mentioned operation is called "enlargement of latent image". On contrast, the densities in the middle and high density parts DM and DH are decreased by decreasing the light intensity control voltage P and the potentials VT and VB. The above-mentioned operation is called "reduction of latent image". The enlargement of the latent image is given by the following representation (5), $$P \uparrow \text{ and } T \uparrow \text{ and } B \uparrow \tag{5}$$

In a similar manner, the reduction of latent image is given by representation (6), $$P \downarrow \text{ and } T \downarrow \text{ and } B \downarrow \tag{6}$$

A qualitative model which is obtained by the above-mentioned qualitative characteristics in the high density part DH is shown in Table 2.

TABLE 2

| | High density error (EH) | |
|---|---|---|
| Sign of error | − | + |
| Saturation operation | T ↓ and B ↓ (T − B = constant) | T ↑ and B ↑ (T − B = constant) |
| Unsaturation operation | P ↓ or, P ↓ and T ↓ and B ↓ (Reduction of latent image) | P ↑ or, P ↑ and T ↑ and B ↑ (Enlargement of latent image) |

The density control operation in the electrophotographic apparatus in accordance with the present invention is accomplished in compliance with the qualitative models shown in Tables 1 and 2.

Referring to FIG. 1, the respective toner images 118, 119 and 120 of the reference marks of the high density, middle density and low density are reproduced on the drum 106 by the developer unit 103. The density of the toner images 118, 119 and 120 are detected by the density sensor 128, and digital data of a high density YH, a middle density YM and a low density YL are output from an A/D converter 114. The digital data of the high density YH, middle density YM and low density YL are applied to the comparator 113 and compared with a high target density YHr, a middle target density YMr and a low target density YLr respectively which are inputted from the target density setting unit 112. The resultant high density error EH, middle density error EM and low density error EL output from the comparator 113 are applied to the input voltage generating unit 150.

The low density error EL and middle density error EM are applied to the low density and middle density control unit 130 of the input voltage generating unit 150, and calculations shown in the following equations (7) and (8) are performed:

$$\Delta T = -KTL \cdot EL \quad \Big\} \quad (7)$$
$$\text{or} \quad \Delta B = KBL \cdot EL$$

$$\Delta P = KPM \cdot EM, \quad (8)$$

where

KTL = a constant with respect to the low density part of the charge voltage T,

KBL = a constant with respect to the low density part of the bias voltage B, and KPM = a constant with respect to the middle density part of the light intensity control voltage P.

If a relatively small value Is set for these constants, the number of trials neccessary to realize a preferable result increases. On the contrary, if a relatively large value is set, the density of the toner images can not meet the target densities. Therefore, preferably these constants are decided by experiments. The variation $\Delta T$ of the charge voltage T, the variation DB of the bias voltage B and the variation $\Delta P$ of the light intensity control voltage P are derived by operation in the equations (7) and (8), and these variations $\Delta T$, $\Delta B$ and $\Delta P$ are applied to the input voltage operation unit 141.

On the other hand, the high density error EH is applied to the high density control unit 182, and calculations shown by the following equations (9) and (10) are accomplished:

$$\Delta T = KTH \cdot EH \quad \Big\} \quad (9)$$
$$\Delta B = KBH \cdot EH$$

$$\Delta P = KPH \cdot EH, \quad (10)$$

where

KTH = a constant with respect to the high density part of the charge voltage T,

KBH = a constant with respect to the high density part of the bias voltage B, and KPH = a constant with respect to the high density part of the light intensity control voltage P.

In the equations (9) and (10), when the high density error EH is a positive value, the enlargement of the latent image is performed. On the other hand, when a high density error EH is a negative value, the reduction of latent image is performed. Furthermore, only the variation $\Delta P$ is derived by the equation (10) in the case of a change of the light intensity control voltage P as shown in FIG. 4.

Hereinafter, the sign of a value is represented by square brackets "[]". For example, if the high density error EH is a negative value, the sign of the high density error EH is represented by "[EH] = −1". On the contrary, if the high density error EH is a positive value, the sign thereof is represented by "[EH] = +1". Moreover, when the high density error EH is within a predetermined small range, the sign is represented by "[EH] = 0".

The variations $\Delta T$, $\Delta B$ and $\Delta P$ derived by the equations (7), (8), (9) and (10) are applied to the input voltage operation unit 141. In the input voltage operation unit 141, the variations $\Delta T$, $\Delta B$ and $\Delta P$ are added to the charge voltage T, bias voltage B and light intensity control voltage P which are stored in the input voltage generating circuit 140 in the previous operation in compliance with the respective signs. Consequently, the charge voltage T, bias voltage B and light intensity control voltage P which are output from the input voltage generating unit 140 are changed. The changed charge voltage T, bias voltage B and light intensity control voltage P are applied to the respective units in the electrophotographic unit 100. Thereby, the densities of the toner images 118, 119 and 120 which will be reproduced in the subsequent operation are changed. The above-mentioned operation cycle is repeated, and the charge voltage T, bias voltage B and the light intensity control voltage P which are output from the input voltage generating unit 150 are adjusted, and thereby the high, middle and low densities YH, YM and YL become gradually coincident with the target densities YHr, YMr and YLr, respectively.

Though the qualitative model in the first embodiment is applied to a "multi-value exposing method" which controls the toner image by varying the time duration of the laser light emissions mentioned above, the qualitative model also is applicable to a "two-value exposure method" which reproduces the toner image by emission or non-emission of the laser light.

[Second embodiment]

Figure 7:
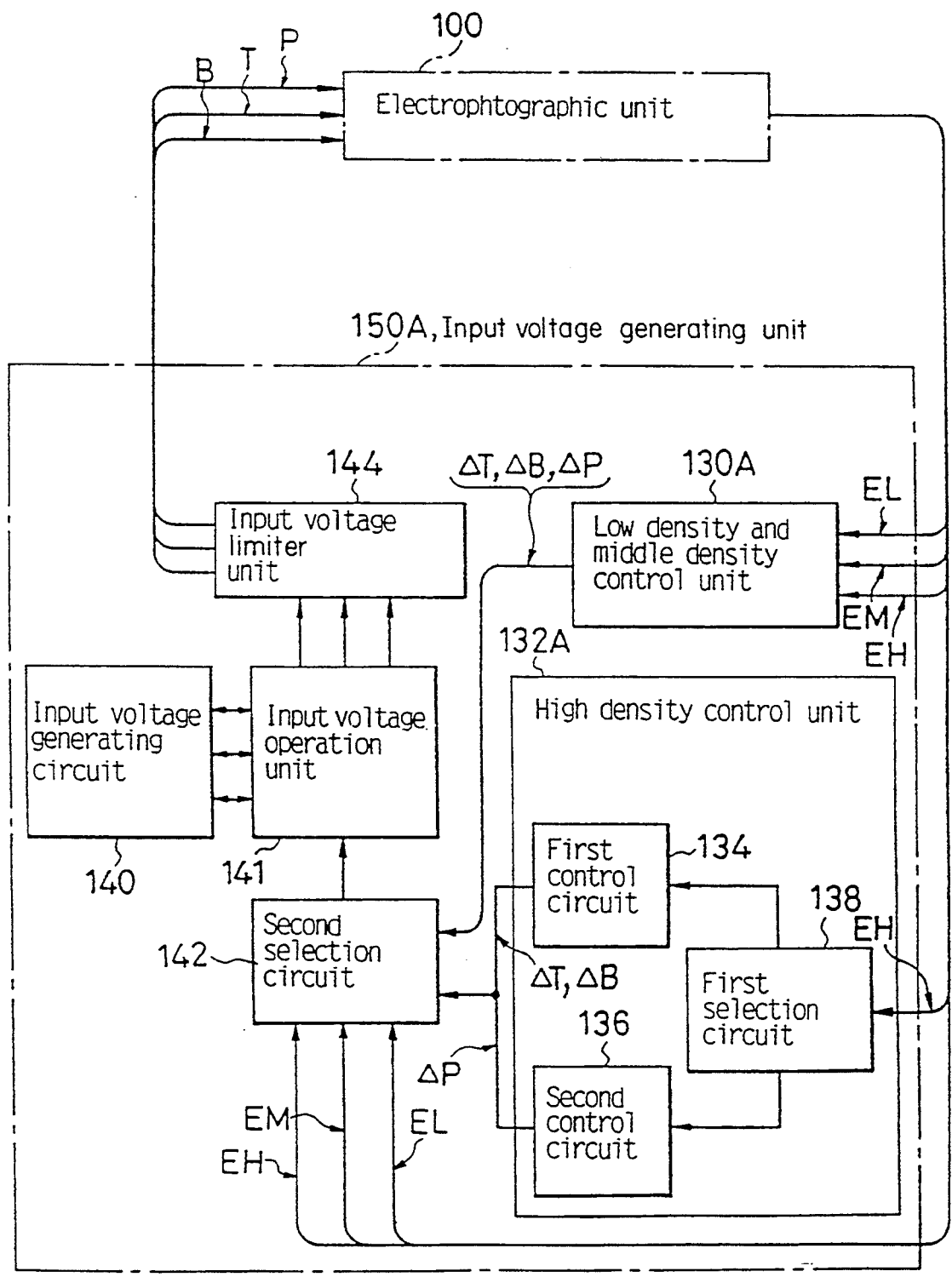
FIG. 7 is a block diagram of a second embodiment of the electrophotographic apparatus in accordance with the present invention.

FIG. 7 is a block diagram of the second embodiment of the electrophotographic apparatus in accordance with the present invention. This embodiment purports to obtain a simpler way of adjustment for the low density and middle density under a certain condition. In this second embodiment, the electrophotographic unit 100 is identical with that of the first embodiment, and the input voltage generating unit 150A only is different from that of the first embodiment.

The low density error EL, middle density error EM and high density error EH are inputted to a low density and middle density control unit 130A of the input voltage generating unit 150A, and calculations shown by equations (11a), (11b) and (11c) are accomplished to obtain variations $\Delta T$ and $\Delta B$ to adjust the low density part of the toner image:

$$\Delta T = -KTL \cdot EL, \ ([EH]=0) \tag{11a}$$

$$\Delta B = KBL \cdot EL, \ ([EH]=[EL]) \tag{11b}$$

$$\Delta T = -KTL \cdot EL, \ ([EH] \neq [EL]) \tag{11c}$$

An equation put in parenthesis which is placed after each equation represents a condition with respect to the equation (11a), (11b) or (11c). In the calculation for the low density and middle density control unit 130A, one equation of the three equations (11a), (11b) and (11c) is selected in compliance with the condition put in parenthesis. For example, if the high density error EH is very small and the sign [EH] is "0", the calculation of the equation (11a) is performed, and the variation $\Delta T$ is output. On the other hand, when the sign [EL] of the low density error EL is identical with the sign [EH] of the high density error EH, the calculation of the equation (11b) is performed and the variation $\Delta B$ is output. In a similar manner, the calculation of the equation (11c) is performed in the case that the sign [EL] is not identical with the sign [EH], and the variation $\Delta T$ is output.

In adjustment operation of the middle density part, a calculation shown by equation (12) is performed:

$$\Delta P = KPM \cdot EM \tag{12}$$

The result of calculation of the low density and middle density control unit 130A is applied to a second selection circuit 142.

Subsequently, a high density control unit 132A comprises a first selection circuit 138, a first control circuit 134 and a second control circuit 136. The first selection circuit 138 selects either one of the first and second control circuits 134 and 136. The selection operation is elucidated hereafter.

The high density error EH is inputted to the first selection circuit 138, and It is determined that the high density error EH is reduced by the previous adjustment operation. If the high density error EH has been reduced in the previous adjustment operation, the first or second control circuit 134 or 136 which is activated in the previous operation is selected. On the contrary, if the high density error EH has not been reduced, the first or second control circuit 134 or 136 which has not been activated in the previous operation is selected, since the adjustment operation of a control circuit which has been activated in the previous operation has not been effective.

In the first control circuit 134 the, calculation shown by equation (13) is performed, and the following variations $\Delta T$ and $\Delta B$ are output.

$$\left.\begin{array}{l}\Delta T = KTH \cdot EH \\ \Delta B = KBH \cdot EH\end{array}\right\} \tag{13}$$

Moreover, a calculation shown by equation (14) is performed in the second control circuit 136, and the variation $\Delta P$ is output.

$$\Delta P = KPH \cdot EH \tag{14}$$

In the second selection circuit 142, a selection operation is performed so that operation of the low density and middle density control unit 130A takes first priority. First, in order to make the low density YL and middle density YM coincide with the low target density YLr and middle target density YMr in the low density part and the middle density part, respectively, the output of the low density and middle density control unit 130A is selected and is inputted to the input operation unit 141. After the low density YL and middle density YM are in coincidence with the low target density YLr and middle target density YMr respectively, namely, when the low and middle density errors EL and EM approach their minimum values, the second selection circuit 142 selects the output of the high density control unit 132A and performs an adjustment operation to decrease the high density error EH.

The variations $\Delta T$, $\Delta B$ and $\Delta P$ output from the second selection circuit 142 are added to the charge voltage T, bias voltage B and light intensity control voltage P which are stored in the input voltage generating circuit 140 in the previous operation of the input calculation unit 141, respectively. The output of the input voltage operation unit 141 is applied to an input voltage limiter unit 144.

The input voltage limiter unit 144 serves to limit the charge voltage T, bias voltage B and light intensity control voltage P so that the voltages do not exceed their respective upper limits. For example, if there is a possibility that the charge voltage T exceeds its upper limit by adding the variation $\Delta T$, the light intensity control voltage P is decreased instead of increasing the charge voltage T. Consequently, in changing the density the same result as that which is caused by increase of the charge voltage is realized. In a similar manner, if there is a possibility that the bias voltage B exceeds its upper limit, the light intensity control voltage P is increased. On the other hand, if there is a possibility that the light intensity control voltage P exceeds its upper limit, the charge voltage T is decreased. The charge voltage T, bias voltage B and light intensity control voltage P which are changed as mentioned above are output from the input voltage limiter unit 144 and applied to the electrophotographic unit 100, and thereby the subsequent toner image is reproduced.

In the high density control unit 132A of the second embodiment, the input signal to activate the first selection circuit 138 can be given by a surface potential sensor 107 placed adjacent to the surface of the drum 106 as shown in FIG. 1. The surface potential sensor 107 can directly detect the potential VT of the photoconductive substance. Therefore, saturation of the potential VT of the photoconductive substance can be detected by setting the saturation potential SA in the surface potential sensor 107 in advance. In the above-mentioned case, when saturation is detected, the first selection circuit 188 selects the first control circuit 134, whereas when the unsaturation state is detected, the second control circuit 136 is selected.

Figure 8:
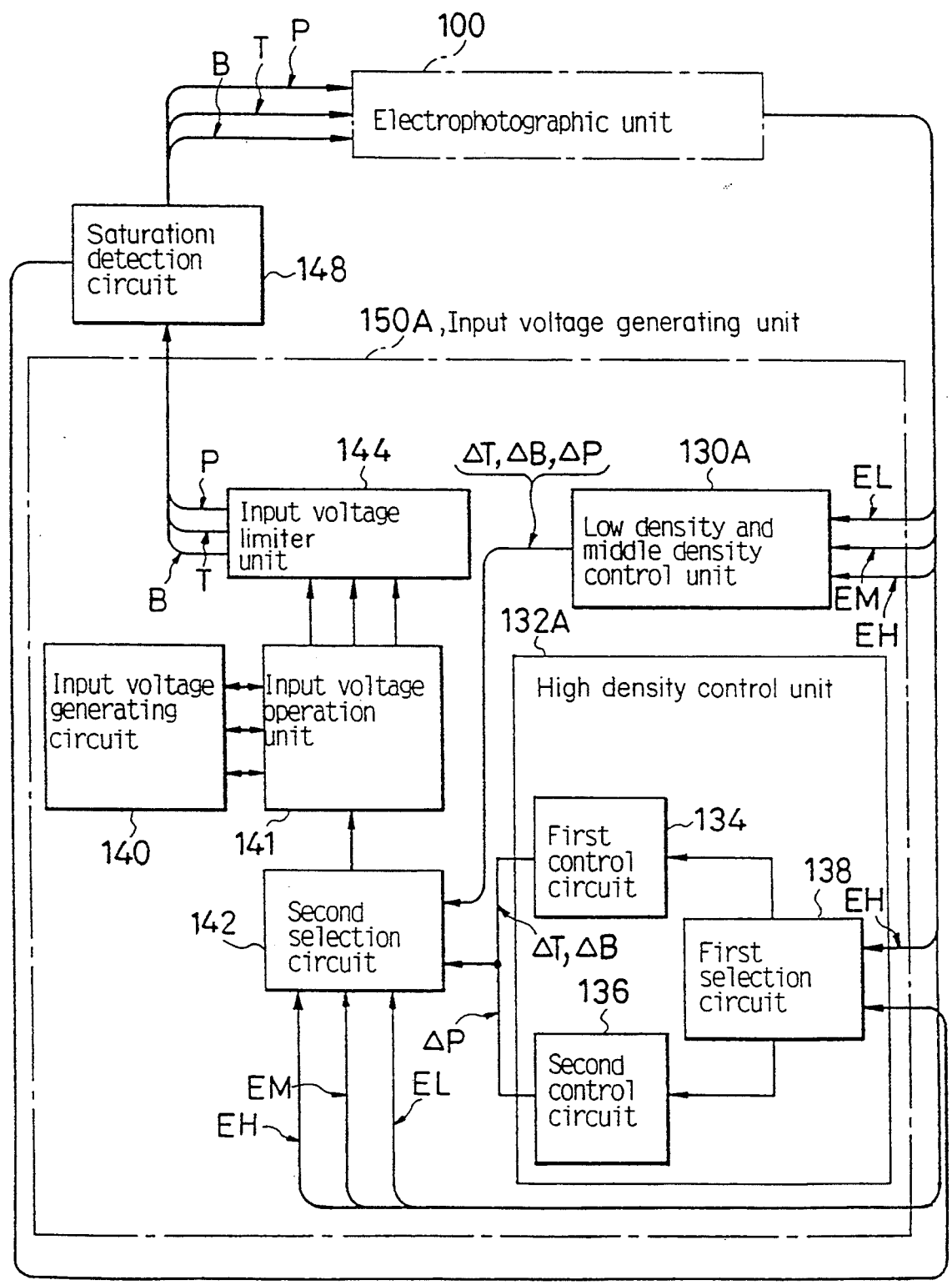
FIG. 8 is a block diagram of an example of an input voltage generating unit.

Furthermore, as another example shown in FIG. 8, a saturation detection circuit 148 may be disposed between the input voltage limiter circuit 144 and the electrophotographic unit 100. The saturation detection circuit 148 detects saturation of the potential VT of the photoconductive substance on the drum 106, on the basis of the charge voltage T and the light intensity control voltage P. When the saturation of the potential is detected, an output signal of the saturation detection circuit 148 is applied to the first selection circuit 138, and thereby selection operation of the first selection circuit 138 is performed.

Incidentally, in the second embodiment, the control operations in the low density and middle density control unit 180A can be performed by changing only the light intensity control voltage P given by the following equation (15):

$$\Delta P = K \cdot EL([EH]=0) \qquad (15),$$

where

K = a predetermined constant.

The above-mentioned method is effective in the case that the exposure light is sufficiently intensive, the potential of the photoconductive substance is saturated, the high density error EH is nearly equal to "0" and the high density YH is constant. In such case, the low density and middle density can be adjusted by changing only the light intensity control voltage P, and hence the adjustment operation is simplified.

[Third embodiment]

Figure 9:
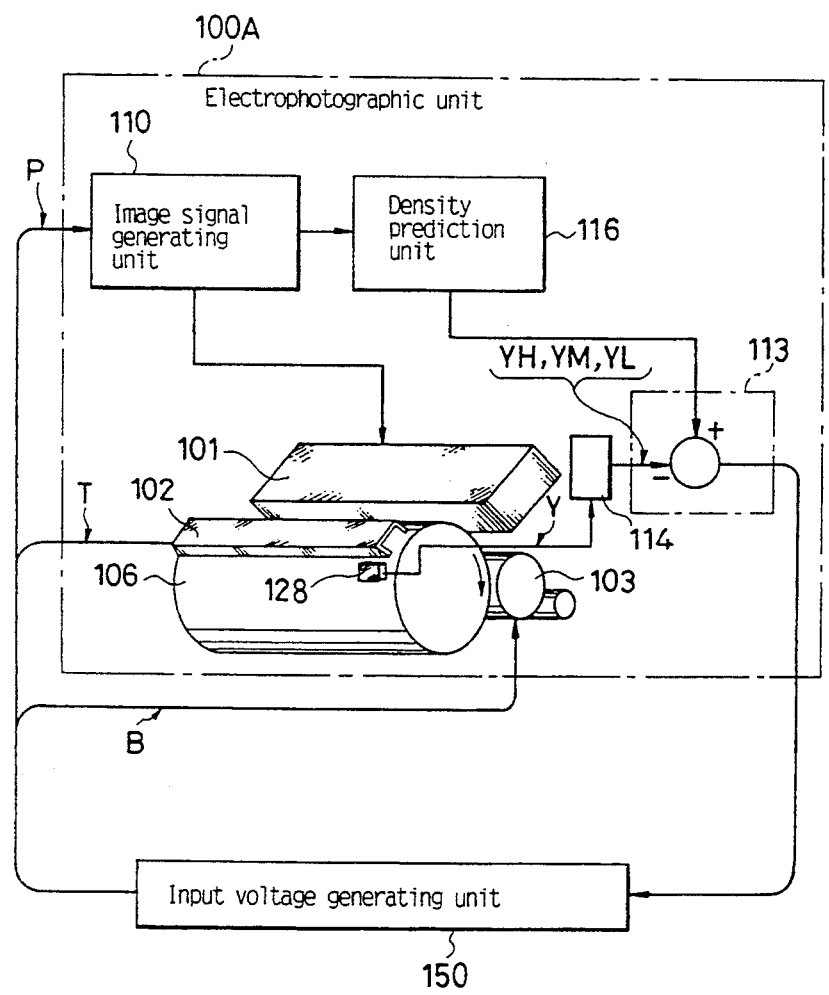
FIG. 9 is a block diagram of a third embodiment of the electrophotographic apparatus in accordance with the present invention.

FIG. 9 is a block diagram of a third embodiment of an electrophotographic apparatus in accordance with the present invention. In the third embodiment, the reference marks 118, 119 and 120 are not used to detect the density of the reproduced image. The input voltage generating unit 150 is identical with that of the first embodiment in configuration and operation.

In the electrophotographic unit 100A, components functioning in the same manner as in the arrangement of FIG. 1 are designated by like numerals, and the descriptions of these components are omitted. The electrophotographic unit 100A in the third embodiment is provided with a density prediction unit 116, and the image signal output from the image signal generating unit 110 is applied thereto. In the density prediction unit 116, an image density (toner image density) of the character of the input signal is predicted on the basis of the inputted image signal, in order to effectively control the image density on the basis of the input signal.

In this third embodiment, the density reference marks 118, 119 and 120 shown in FIG. 1 are not used to detect density. Instead of using the density reference marks, the density sensor 128 detects the toner image which is reproduced on the basis of the output of the image signal generating unit 110.

Figure 10B:
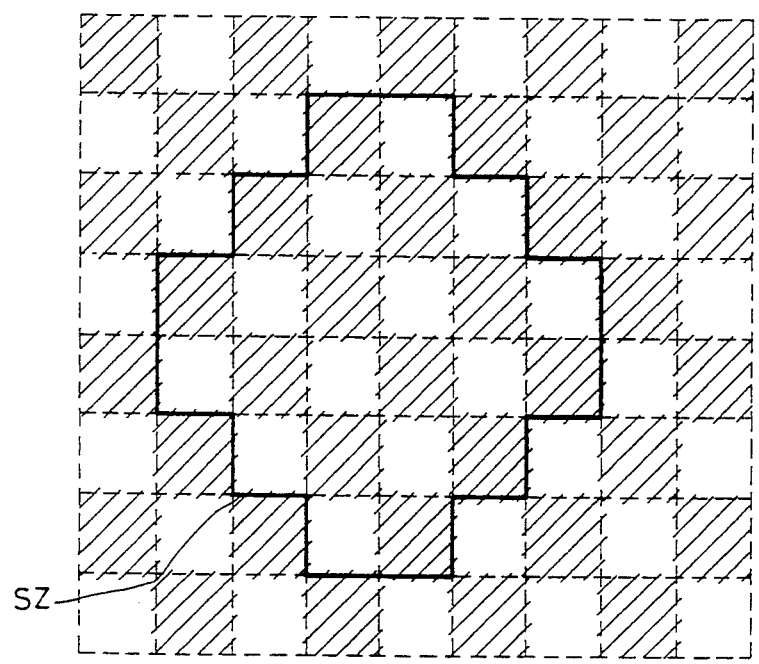
FIGS. 10 (a), 10(b) and 10(c) are plan views of examples of toner images.
Figure 10C:
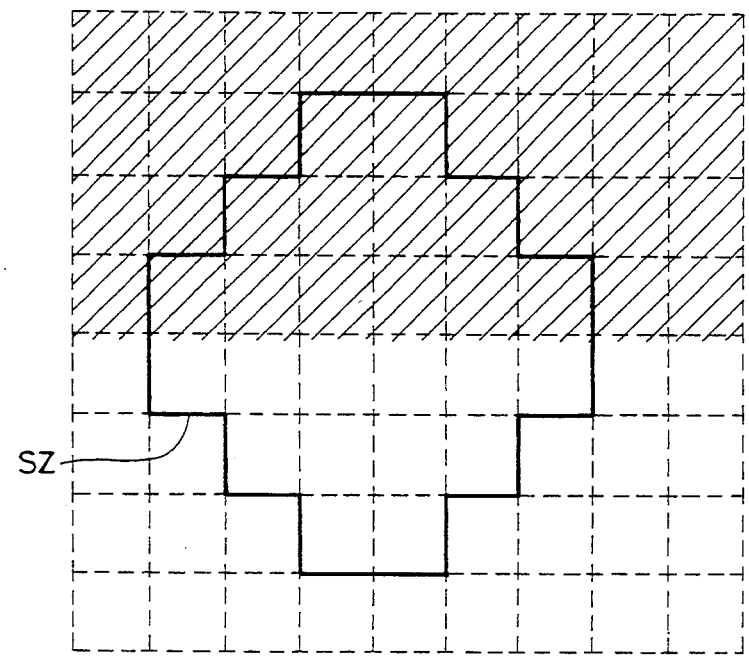

FIGS. 10(a), 10(b) and 10(c) are illustrations of toner images which are detected by the density sensor 128. Referring to FIGS. 10(a), 10(b) and 10(c), squares partitioned by dotted lines represent pixels which are to be exposed by a laser beam from the laser beam exposing unit 101. An area surrounded by a solid line is a detection area SZ of the density sensor 128. Hatched parts in FIGS. 10(a), 10(b) and 10(c) represent the pixels having toner.

FIG. 10(a) is an illustration in the case of the toner image of letter "C". FIG. 10(b) is an illustration in the case of the toner image of a checkered pattern, and FIG. 10(c) is an illustration in the case of the toner image at which half of the detecting area of the sensor 128 is covered with toner.

In general, the area of a toner image of one pixel which is made by exposing by the laser beam followed by development with toner is designed be larger than the area of the pixel. Consequently, every toner image overflows from the boundary of its respective pixels as shown in FIGS. 10(a), 10(b) and 10(c). Therefore, even in cases where the number of pixels (12 pixels in these examples) existing in the detecting area SZ are the same as shown by the hatched parts in FIGS. 10(a), 10(b) and 10(c), areas which are occupied by the toner images in the detecting area SZ are different from each other depending on the shape of the toner image in the detecting area SZ; hence, the output from the density sensor 128 is changed depending on the shape of the toner image. In the toner images shown by FIGS. 10(a), 10(b) and 10(c), for example, the highest density is detected in the toner image shown by FIG. 10(b), and the lowest density is detected in the toner image shown by FIG. 10(c).

In the density prediction unit 116, the shape of an image existing in the detection area SZ of the density sensor 128 is detected on the basis of the image data which is inputted from the image signal generating unit 110, and compensation data for predicting an error which is caused by the above-mentioned overflow of the toner image is generated. The data of the predicted density which is corrected by the compensation data is applied to the comparator 113, and is compared with the data of a detected density of the density sensor 128. The low density error EL, middle density error EM and high density error EH of the comparison result are applied to the input voltage generating unit 150. The operation in the input voltage generating unit 150 is identical with that of the first embodiment. As mentioned above, in this third embodiment, the reference marks are not used to detect the density, but the charge voltage T, bias voltage B and light intensity control voltage P of the electrophotographic apparatus are controlled on the basis of the density of an image to be actually reproduced. Therefore, the reproduced toner image has high fidelity with respect to an original image.

In this third embodiment, further in the case that the image of letters only is reproduced from a code data of characters, a predetermined number of letters (alphabet or Hiragana letters, for example) are preliminarily selected and the respective densities of the selected letters (which are determined by the patterns thereof) can be registered in the density prediction unit 116 in advance. When the registered letter is detected in the density prediction unit 116, the prediction density data is output on the basis of the registered data. Consequently, the correction of density in the density prediction unit 116 is no longer necessary, and thereby the configuration of the density prediction unit 116 is simplified.

Moreover, in the third embodiment, an image having a uniform density in an area which is larger than the detecting area of the density sensor 128 is set as the detecting area of the density sensor 128 by the density prediction unit 116. The density of the image is detected by the density sensor 128. The density prediction unit 116 outputs the predictive density data of the image to the comparator 113. The predictive density data is compared with the detected density data of the density sensor 128 in the comparator 113. The remaining operation is identical with that of the third embodiment. In this third example, since the area of the image to be detected is set larger than the detecting area SZ of the density sensor 128, even if there is a positional error in a mechanical mounting element of the density sensor 128, an error in density detection is avoidable.

[Fourth embodiment]

Figure 11:
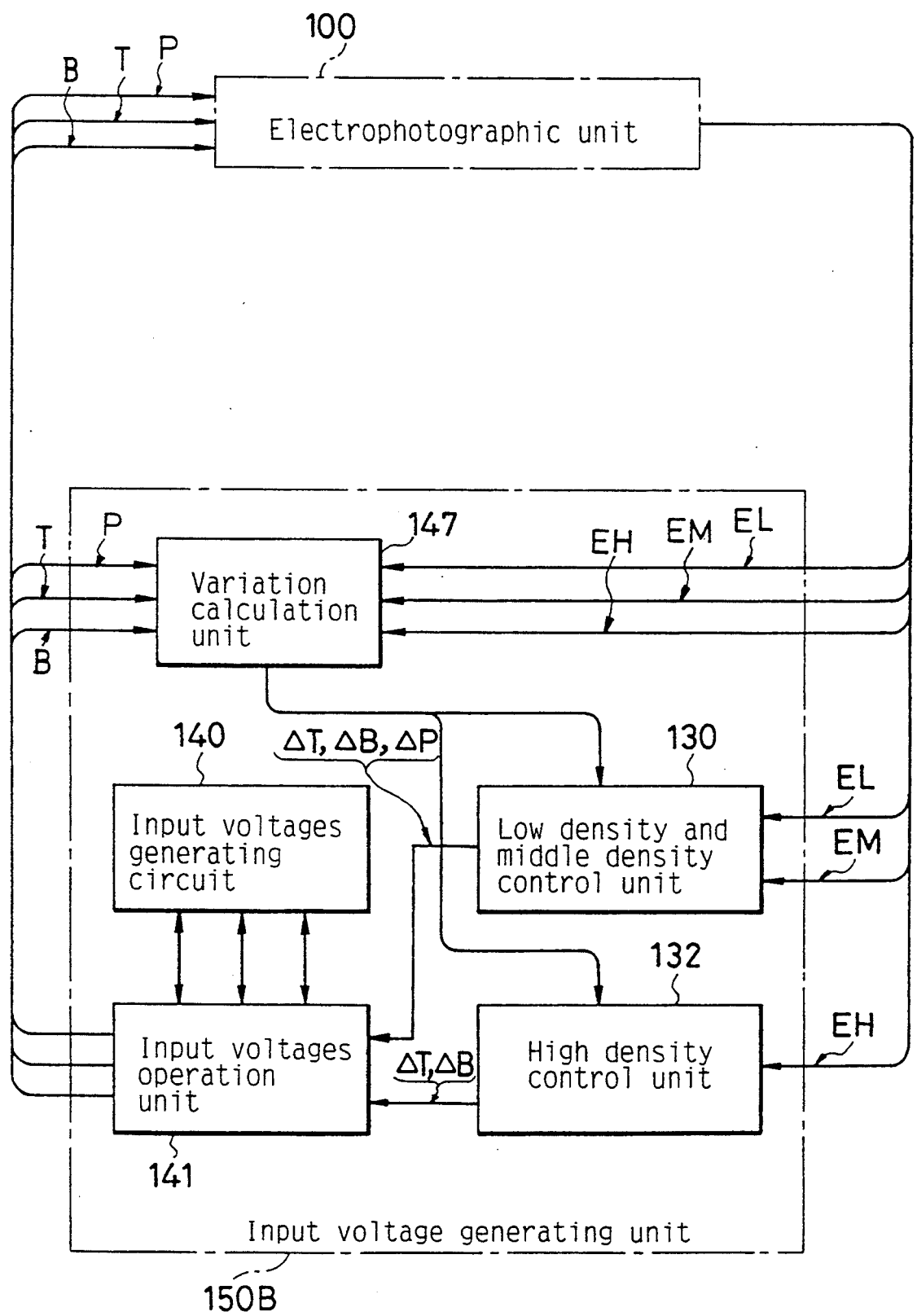
FIG. 11 is a block diagram of a fourth embodiment of the electrophotographic apparatus in accordance with the present invention.

FIG. 11 is a block diagram of a fourth embodiment of the electrophotographic apparatus in accordance with the present invention. In the fourth embodiment, the configuration and operation of the electrophotographic unit 100 is identical with those of the first embodiment. Moreover, the low density and middle density control unit 130, high density control unit 132, input voltage generating circuit 140 and input voltage operation unit 141 in the input voltage generating unit 150B are the same as the elements elucidated in the first embodiment in both their configuration and operation.

In the fourth embodiment, a variation calculation unit 147 is provided in the input voltage generating unit 150B. The charge voltage T, bias voltage B and light intensity control voltage P output from the input voltage operation unit 141 are applied to the variation calculation unit 147. Furthermore, the low density error EL, middle density error EM and high density error EH are applied thereto. The variation calculation unit 147 is provided with a memory which stores the variation $\Delta T$ of the charge voltage T, the variation $\Delta B$ of the bias voltage B, variation $\Delta P$ of the light intensity control voltage P, the low density error EL, the middle density error EM and the high density error EH in the previous operation. Subsequently, the calculation shown by equation (16) is performed on the basis of the stored data, and constants KTH (new) and KBH (new) are derived;

$$KTH(\text{new}) = \frac{\Delta T(\text{old})}{\Delta EH}$$
$$KBH(\text{new}) = \frac{\Delta B(\text{old})}{\Delta EH}$$
(16)

where $\Delta T(\text{old})$, $\Delta B(\text{old})$ = variations of the charge voltage T and bias voltage B in the previous operation, respectively, and $\Delta EH$: the result of subtracting between the high density error EH in the previous operation and from that in the subsequent operation.

The constant KTH(new) is a new constant with respect to control of the high density part of the charge voltage T, and the constant KBH(new) is a new constant with respect to control of the high density part of the bias voltage B. These new constants are used in the calculation operation in the subsequent adjustment operation.

As mentioned above, the constants which are used for calculation in the high density control unit 132 are adjusted to more suitable values to achieve the target value more quickly by using the variations $\Delta T$ and $\Delta B$ and the high density error EH.

In a similar manner, remaining constants are derived by the following equations (17):

$$KTL(\text{new}) = \frac{-\Delta T(\text{old})}{\Delta EL}$$
$$KBL(\text{new}) = \frac{\Delta B(\text{old})}{\Delta EL}$$
$$KPM(\text{new}) = \frac{\Delta P(\text{old})}{\Delta EM}$$
$$KPH(\text{new}) = \frac{\Delta P(\text{old})}{\Delta EH}$$
(17)

Consequently, more suitable variations $\Delta T$, $\Delta B$ and $\Delta P$ are obtained by using these renewed constants, and the number of repetitions of operation necessary to reach the target densities is reduced.

Fifth embodiment]

In the above-mentioned first and second embodiments, the high density reference mark 118, middle density reference mark 119 and low density reference mark are produced on the end part of a drum 106 as shown in FIG. 1. Therefore, the end part can not be used to produce an image to be reproduced, and the drum 106 must be extended by a length to produce the density reference marks 118, 119 and 120.

Figure 12:
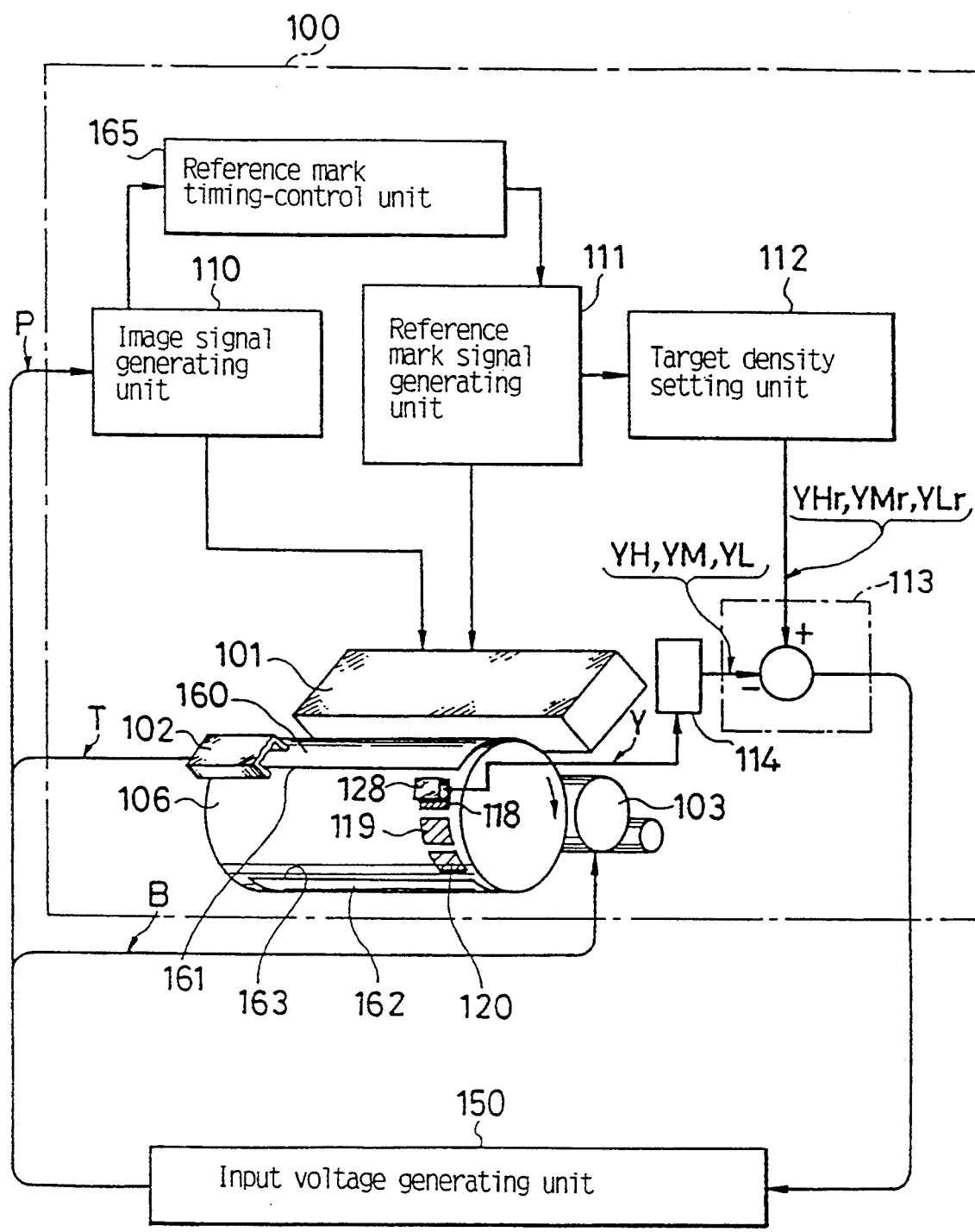
FIGS 12(a) and 12(b) are block diagrams of a fifth embodiment of the electrophotographic apparatus in accordance with the present invention.
Figure 12B:
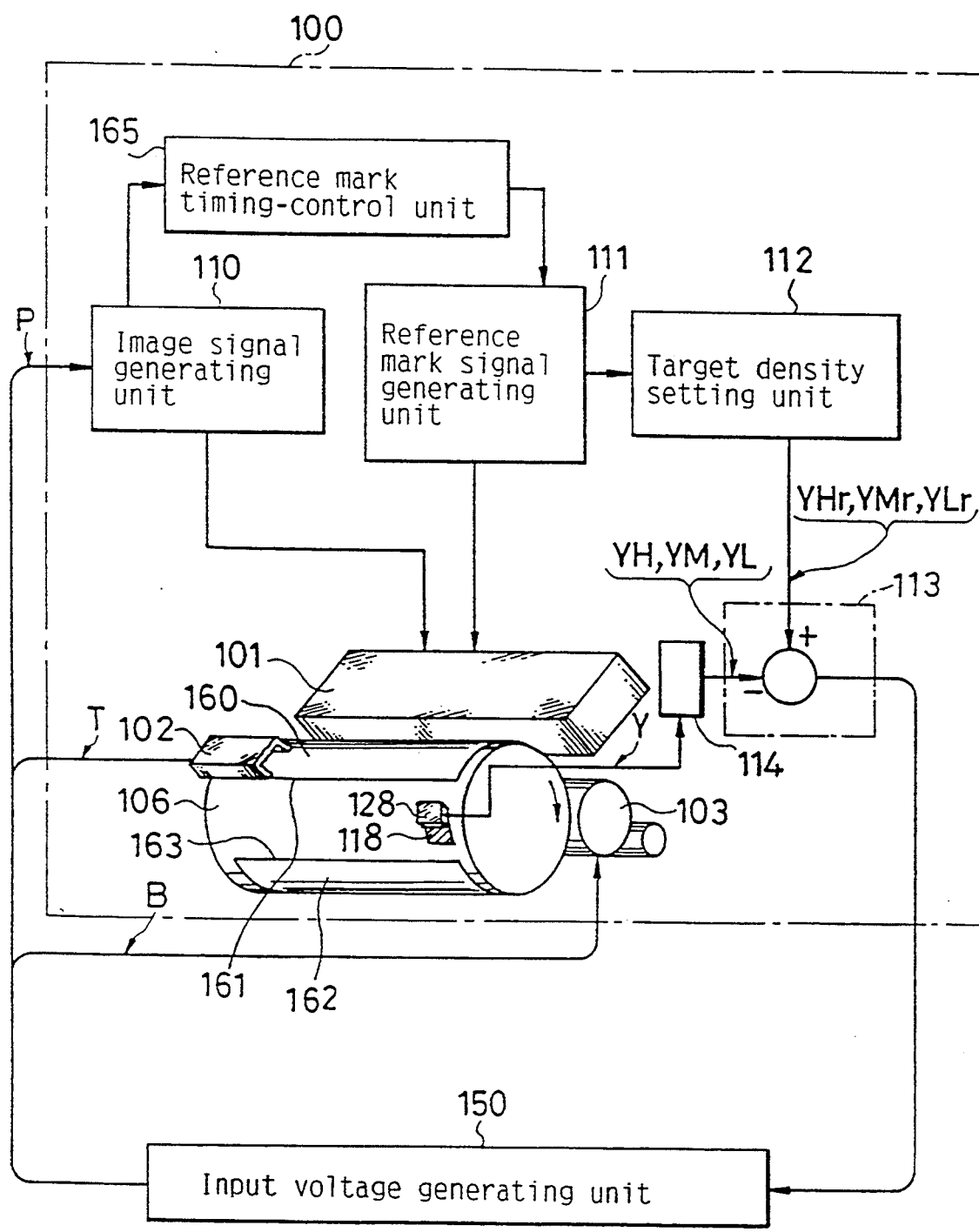

FIGS. 12(a) and 12(b) are block diagrams of a fifth embodiment of the electrophotographic apparatus in accordance with an present invention. In the fifth embodiment, when the image to be reproduced is produced on the drum 106, the density reference marks 118, 119 and 120 are not produced on the drum 106. The density reference marks 118, 119 and 120 are produced on the drum 106 after the reproduction of the image is completed, or when there is no image on the drum 106.

In a first example shown in FIG. 12(a), the density reference marks 118, 119 and 120 are produced between a tail edge 161 of an antecedent first image 160 and a top edge 163 of a successive second image 162. As in the other example as shown in FIG. 12(b), only the high density reference mark 118 is produced between the tale edge 161 of the antecedent first image 160 and the top edge 163 of the successive second image 162. Subsequently, only the middle density reference mark 119 is produced between a tail edge (not shown) of the second image 162 and a top edge of a third image (not shown). Furthermore, the low density reference mark 120 is produced between a tail edge of the third image and a top edge of a fourth image (not shown). As mentioned above, the high density reference mark 118, middle density reference mark 119 and low density reference mark 120 are inserted between neighboring two images in turn.

Operation for producing the density reference marks 118, 119 and 120 in this fifth embodiment is controlled by a reference mark timing-control unit 165 as shown in FIGS. 12(a) and 12(b). In the reference mark timing-control unit 165, an end point of the image is detected on the basis of the signal inputted from the image signal generating unit 110, and accordingly, an instruction signal to generate a predetermined density reference mark signal is output from the reference mark signal generating unit 111. According to this fifth embodiment, since the entire width of the drum 106 is usable to produce the image to be produced, a wider image can be reproduced with a drum 106 having the same width.

In the above-mentioned embodiments, three kinds of the reference marks of high density, middle density and low density are used to control the density of the toner image. In the case that a higher accuracy is not required in the density control, two kinds of reference marks of high density and low density are applicable thereto. Consequently, the qualitative models in right column of the Table 1 are not used and the calculation with respect to the middle density error shown by the equations (8) and (12) are not performed, and thus, the calculation operation is simplified.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is

1. An electrophotographic apparatus comprising:

a member having a photoconductive substance thereon, charge means for electrostatically charging said photoconductive substance, image signal generating means for outputting an image signal indicative of an image to be reproduced on said photoconductive substance, reference mark signal generating means for outputting an image signal indicative of a reference mark of a high density and a reference mark of a low density to be reproduced on said photoconductive surface as reference mark toner images, exposure means for producing an electrostatic latent image on said photoconductive substance by a light beam on the basis of the outputs of said image signal generating means and said reference mark signal generating means, target density setting means for setting a low target density and a high target density and outputting data indicative of said target densities, developer means for developing said latent image by toner, density sensor means for detecting densities of the respective reference mark toner images, and for outputting data indicative of said densities of said reference mark toner images, comparator means for comparing said data indicative of the densities of said reference mark toner images with said data indicative of said target densities and outputting data indicative of a low density error and a high density error, low density and middle density control means for calculating a variation of a charge voltage for applying to said charge means, a variation of a developer bias voltage for biasing said developer means and a variation of a light intensity control voltage for controlling a light intensity of said exposure means on the basis of said low density error and constants predetermined on the basis of qualitative relations among the density of a reproduced image, said charge voltage, said developer bias voltage and said light intensity control voltage, and for outputting at least one of the variation of the charge voltage having an opposite sign to the sign of said low density error and the variation of said developer bias voltage having the same sign as the sign of said low density error on the basis of said qualitative relations, high density control means for calculating a variation of said charge voltage, a variation of said developer bias voltage and a variation of said light intensity control voltage on the basis of said high density error and constants predetermined on the basis of qualitative relations among the density of said reproduced image, said charge voltage, said developer bias voltage and said light intensity control voltage, and outputting one set of the variations selected from a first set of the variation of said charge voltage and the variation of said developer bias voltage having the same signs as the sign of said high density error by maintaining the difference between said charge voltage and said developer bias voltage at a constant, a second set of the variation of said light intensity control voltage having the same sign as the sign of said high density error and a third set of the variation of said light intensity control voltage, the variation of said charge voltage and the variation of said developer bias voltage having the same signs as the sign of said high density error, input voltage generating means for generating said charge voltage, said developer bias voltage and said intensity control voltage, and input voltage operation means for changing said charge voltage, said developer bias voltage and said light intensity control voltage output by said input voltage generating means on the basis of at least one of variations output from said low density and middle density control means and said high density control means.

2. An electrophotographic apparatus in accordance with claim 1, wherein said low density and middle density control means outputs at least one of the variation of said charge voltage having an opposite sign to that of said low density error in the case that said high density error is within a predetermined allowable range, the variation of said developer bias voltage having the same sign as that of said low density error in the case that the sign of said high density error is identical with that of said low density error, the variation of said charge voltage having an opposite sign to that of said low density error in the case that the sign of said high density error is different from that of said low density error and the variation of said light intensity control voltage.

3. An electrophotographic apparatus in accordance with claim 1, wherein said low density and middle density control means outputs the variation of said light intensity control voltage having the same sign as that of said low density error in the case that said high density error is within a predetermined allowable range.

4. An electrophotographic apparatus in accordance with claim 1, wherein said high density control means comprises a first control means for calculating both the variations of said charge voltage and said developer bias voltage which have the same sign as that of said high density error, a second control means for calculating the variation of said light intensity control voltage having the same sign as that of said high density error on the basis of said high density error and a first selection means for selecting one of said first control means and said second control means on the basis of variation a trend of said high density error.

5. An electrophotographic apparatus in accordance with claim 4, wherein
said first selection means selects the same one of said first control means or said second control means activated in a previous operation in the event that said high density error decreases below a predetermined value, and selects the other one of said first control means said second control means activated in said previous operation in the event that said high density error is not decreased below said predetermined value.

6. An electrophotographic apparatus in accordance with claim 4, wherein
said first selection means comprises a saturation detector detecting a saturation of the potential of said photoconductive substance, and selects said first control means in the event that said photoconductive substance is saturated, and selects said second control means in the event that said photoconductive substance is not saturated.

7. An electrophotographic apparatus in accordance with claim 4, wherein
said first selection means comprises a saturation detection circuit for detecting a saturation of the potential of said photoconductive substance on the basis of said charge voltage, said developer bias voltage and said light intensity control voltage, and selects said first control means in the event that said photoconductive substance is saturated, and selects said second control means in the event that said photoconductive substance is not saturated.

8. An electrophotographic apparatus in accordance with claim 1, further comprising
input voltage limiter means connected to said input voltage operation means for preventing said charge voltage, said developer bias voltage and said light intensity control voltage from exceeding predetermined respective values.

9. An electrophotographic apparatus in accordance with claim 1, further comprising
second selection means connected to said input voltage operation means for selecting an output of one of said low density and middle density control means and said high density control means and for presenting it to said input voltage operation means.

10. An electrophotographic apparatus in accordance with claim 8, wherein
said input voltage limiter means decreases at least one of said developer bias voltage and said light intensity control voltage as a substitute for an increase of said charge voltage in the event that said charge voltage exceeds a predetermined upper limit, performs at least one of a decrease of said charge voltage and an increase of said light intensity control voltage as a substitute for an increase of said developer bias voltage in the event that said developer bias voltage exceeds a predetermined upper limit, and performs at least one of a decrease of said charge voltage and an increase of said developer bias voltage as a substitute for an increase of said light intensity control voltage in the event that said light intensity control voltage exceeds a predetermined upper limit.

11. An electrophotographic apparatus in accordance with claim 1, further comprising
variation calculation means for calculating said constants in said low density and middle density control means and said high density control means on the basis of said variation of said charge voltage, said variation of said developer bias voltage, said variation of said light intensity control voltage, said high density error and said low density error.

12. An electrophotographic apparatus comprising:
a member having photoconductive substance thereon,
charge means for electrostatically charging said photoconductive substance,
image signal generating means for outputting an image signal indicative of an image to be reproduced on said photoconductive substance,
reference mark signal generating means for outputting an image signal indicative of a reference mark of a high density, a reference mark of a low density and a reference mark of a middle density between the high density and low density to be reproduced on said photoconductive substance,
exposure means for producing an electrostatic latent image on said photoconductive substance by a light beam on the basis of the outputs of said image signal generating means and said reference mark signal generating means as reference mark toner images,
target density setting means for setting a low target density, a middle target density and a high target density and outputting data indicative of said target densities,
developer means for developing said latent image by toner,
density sensor means for detecting densities of the respective reference mark toner images, and for outputting data indicative of said densities of said reference mark toner images,
comparator means for comparing said data of the densities of said reference mark toner images with said data of said target densities and outputting data indicative of a low density error, a middle density error and a high density error,
low density and middle density control means for calculating a variation of a charge voltage for applying to said charge means, a variation of a developer bias voltage for biasing said developer means and a variation of a light intensity control voltage for controlling a light intensity of said exposure means on the basis of said low density error and said middle density error and constants predetermined on the basis of qualitative relations among the density of a reproduced image, said charge voltage, said developer bias voltage and said light intensity control voltage, and for outputting at least one of the variation of the charge voltage having an opposite sign to the sign of said low density error and the variation of said developer bias voltage having the same sign as the sign of said low density error on the basis of said qualitative relations, and for outputting the variation of said light intensity control voltage having the same sign as the middle density error,
high density control means for calculating a variation of said charge voltage, a variation of said developer bias voltage and a variation of said light intensity control voltage on the basis of said high density error and constants predetermined on the basis of qualitative relations among the density of said reproduced image, said charge voltage, said developer bias voltage and said light intensity control voltage, and outputting one set of the variations selected from a first set of the variation of said charge voltage and the variation of said developer bias voltage having the same signs as the sign of said high density error by maintaining the difference between said charge voltage and said developer bias voltage at a constant, a second set of the variation of said light intensity control voltage having the same sign as the sign of said high density error and a third set of the variation of said light intensity control voltage, the variation of said charge voltage and the variation of said developer bias voltage having the same signs as the sign of said high density error, input voltage generating means for generating said charge voltage, said developer bias voltage and said intensity control voltage, and input voltage operation means for changing said charge voltage, said developer bias voltage and said light intensity control voltage output by said input voltage generating means on the basis of at least one of variations output from said low density and middle density control means and said high density control means.

13. An electrophotographic apparatus in accordance with claim 12, wherein said low density and middle density control means outputs at least one of the variation of said charge voltage having an opposite sign to that of said low density error in the case that said high density error is within a predetermined allowable range, the variation of said developer bias voltage having the same sign as that of said low density error in the case that the sign of said high density error is identical with that of said low density error, the variation of said charge voltage having an opposite sign to that of said low density error in the case that the sign of said high density error is different from that of said low density error and the variation of said light intensity control voltage having the same sign as that of said middle density error, on the basis of at least two errors selected from said low density error, middle density error and high density error.

14. An electrophotographic apparatus in accordance with claim 12, wherein said low density and middle density control means outputs the variation of said light intensity control voltage having the same sign as that of said low density error in the case that said high density error is within a predetermined allowable range.

15. An electrophotographic apparatus in accordance with claim 12, wherein said high density control means comprises a first control means for calculating both the variations of said charge voltage and said developer bias voltage which have the same sign as that of said high density error, a second control means for calculating the variation of said light intensity control voltage having the same sign as that of said high density error on the basis of said high density error and a first selection means for selecting one of said first control means and said second control means on the basis of a variation trend of said high density error.

16. An electrophotographic apparatus in accordance with claim 15, wherein said first selection means selects the same one of said first control means or said second control means activated in a previous operation in the event that said high density error decreases below a predetermined value, and selects the other one of said first control means said second control means activated in said previous operation in the event that said high density error is not decreased below said predetermined value.

17. An electrophotographic apparatus in accordance with claim 15, wherein said first selection means comprises a saturation detector detecting a saturation of the potential said photoconductive substance, and selects said first control means in the event that said photoconductive substance is saturated, and selects said second control means in the event that said photoconductive substance is not saturated.

18. An electrophotographic apparatus in accordance with claim 15, wherein said first selection means comprises a saturation detection circuit for detecting a saturation of the potential of said photoconductive substance on the basis of said charge voltage, said developer bias voltage and said light intensity control voltage and selects said first control means in the event that said photoconductive substance is saturated, and selects said second control means in the event that said photoconductive substance is not saturated.

19. An electrophotographic apparatus in accordance with claim 12, further comprising input voltage limiter means connected to said input voltage operation means for preventing said charge voltage, said developer bias voltage and said light intensity control voltage from exceeding predetermined respective values.

20. An electrophotographic apparatus in accordance with claim 12, further comprising second selection means connected to said input voltage operation means for selecting an output of one of said low density and middle density control means and said high density control means and for presenting it to said input voltage operation means.

21. An electrophotographic apparatus in accordance with claim 19, wherein said input voltage limiter means decreases at least one of said developer bias voltage and said light intensity control voltage as a substitute for an increase of said charge voltage in the event that said charge voltage exceeds a predetermined upper limit, performs at least one of a decrease of said charge voltage and an increase of said light intensity control voltage as a substitute for an increase of said developer bias voltage in the event that said developer bias voltage exceeds a predetermined upper limit, and performs at least one of a decrease of said charge voltage and an increase of said developer bias voltage as a substitute for an increase of said light intensity control voltage in the event that said light intensity control voltage exceeds a predetermined upper limit.

22. An electrophotographic apparatus in accordance with claim 12, further comprising variation calculation means for calculating said constants in said low density and middle density control means and said high density control means on the basis of said variation of said charge voltage, said variation of said developer bias voltage, said variation of said light intensity control voltage, said high density error, said middle density error and said low density error.

* * * * *